(12) United States Patent
Ueno et al.

(10) Patent No.: US 8,497,024 B2
(45) Date of Patent: Jul. 30, 2013

(54) ORGANOPOLYSILMETHYLENE-SILOXANE AND A CURED PRODUCT THEREOF

(75) Inventors: Manabu Ueno, Annaka (JP); Toshio Shiobara, Annaka (JP); Tsutomu Kashiwagi, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 44 days.

(21) Appl. No.: 12/860,682

(22) Filed: Aug. 20, 2010

(65) Prior Publication Data

US 2011/0046319 A1   Feb. 24, 2011

(30) Foreign Application Priority Data

Aug. 21, 2009   (JP) ................................ 2009-192209

(51) Int. Cl.
*B32B 9/04*   (2006.01)

(52) U.S. Cl.
USPC ........................... 428/447; 313/483; 525/477

(58) Field of Classification Search
None
See application file for complete search history.

(56) References Cited

U.S. PATENT DOCUMENTS

| | | | | |
|---|---|---|---|---|
| 2,452,895 | A | * 11/1948 | Bluestein | 556/434 |
| 2,582,799 | A | 1/1952 | Sauer | |
| 3,338,951 | A | * 8/1967 | Knaub | 528/35 |
| 4,110,386 | A | * 8/1978 | Yajima et al. | 264/29.5 |
| 5,302,648 | A | * 4/1994 | Fujimoto et al. | 524/200 |
| 5,445,873 | A | * 8/1995 | Yaginuma et al. | 427/96.4 |
| 5,665,805 | A | * 9/1997 | Hatanaka et al. | 524/322 |
| 5,763,540 | A | 6/1998 | Nakata et al. | |
| 6,492,480 | B1 | * 12/2002 | Nagashima et al. | 528/19 |
| 2009/0121180 | A1 | * 5/2009 | Tsubokawa et al. | 252/182.3 |
| 2009/0189510 | A1 | * 7/2009 | Kanamori et al. | 313/498 |

FOREIGN PATENT DOCUMENTS

| | | | |
|---|---|---|---|
| GB | 1045111 | * | 10/1966 |
| JP | 5-320350 | A | 12/1993 |
| JP | 8-109264 | A | 4/1996 |
| JP | 8-109265 | A | 4/1996 |
| JP | 8-109266 | A | 4/1996 |
| JP | 9-227781 | A | 9/1997 |
| JP | 9-227782 | A | 9/1997 |
| JP | 9-227783 | A | 9/1997 |
| JP | 3069655 | B2 | 7/2000 |
| WO | WO 01/30887 | A1 | 5/2001 |

OTHER PUBLICATIONS

"Poly(dimethylsilylenemethylene-co-dimethylsiloxane): A Regularly Alternating Copolymer of Poly(dimethylsiloxane) and Poly(dimethylsilylenemethylene" authored by Interrante et al. and published in Macromolecules (2001) 34, 1545-1547.*
Chapter entitled "Silicones" published in the Kirk-Othmer Encyclopedia of Chemical Technology authored by Butts et al. and published by Wiley online Dec. 20, 2002.*
Extended European Search Report dated Dec. 21, 2010 for European Application No. 10173238.6.
English Translation of JP 30-2644 dated Apr. 21, 1955.
English Translation of JP 30-6144 dated Aug. 31, 1955.

* cited by examiner

*Primary Examiner* — Marc Zimmer
(74) *Attorney, Agent, or Firm* — Birch, Stewart, Kolasch & Birch, LLP

(57) ABSTRACT

Organopolysilmethylene-siloxane of the formula (1):

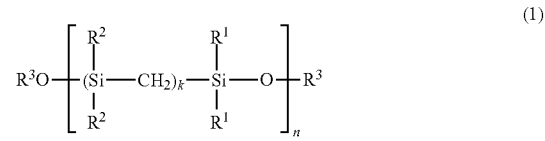

wherein each $R^1$ is, independently of one another, an unsubstituted or substituted monovalent hydrocarbon group having 1 to 10 carbon atoms other than an alkenyl group, an alkoxy group, a hydroxy group, and a halogen atom; each $R^2$ is, independently of one another, an unsubstituted or substituted monovalent hydrocarbon group having 1 to 10 carbon atoms other than an alkenyl group, an alkoxy group, a hydroxy group, a halogen atom, and $(R^1)_3SiCH_2$—, wherein each $R^3$ is, independently of one another, a hydrogen atom and an alkyl group having 1 to 4 carbon atoms; k is an integer of 1 to 100; and n is an integer of 1 to 1000; said organopolysilmethylene-siloxane having, in a molecule, at least two out of alkoxy groups, hydroxy groups, and halogen atoms bonded to one or more silicon atoms.

5 Claims, 1 Drawing Sheet

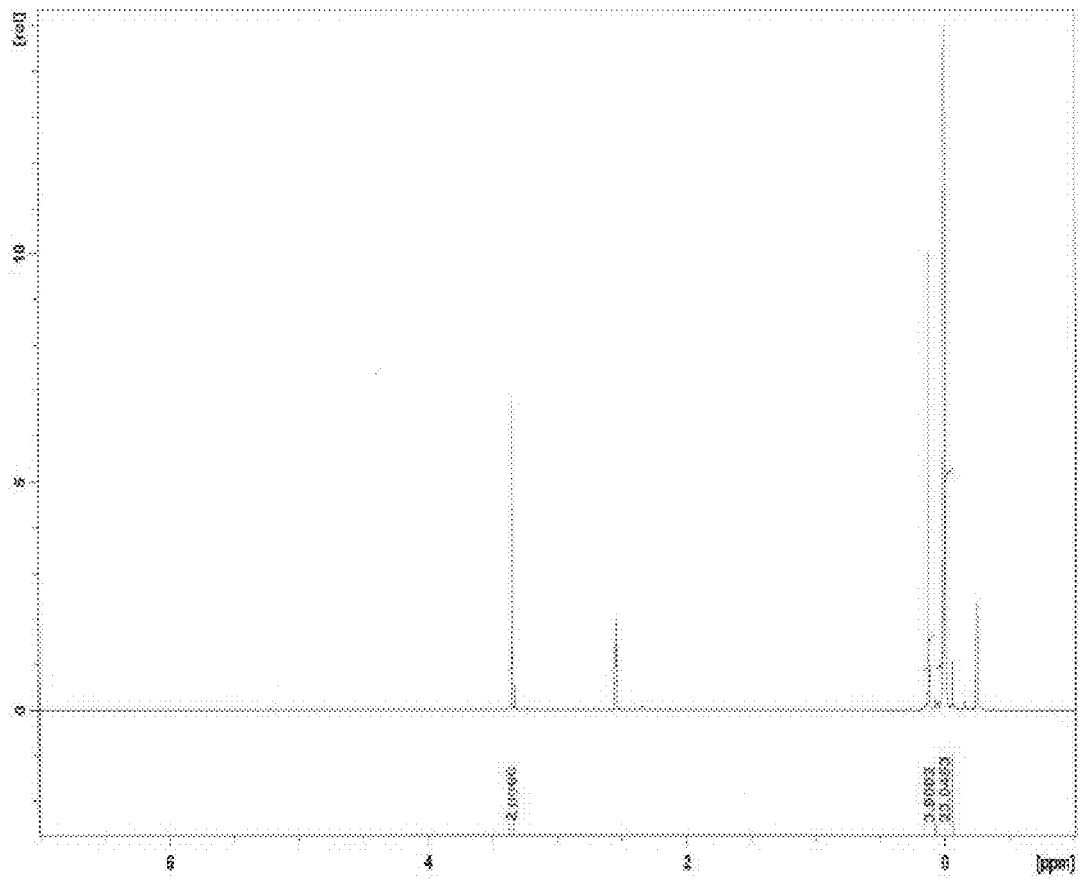

ORGANOPOLYSILMETHYLENE-SILOXANE AND A CURED PRODUCT THEREOF

CROSS REFERENCES

This application claims the benefits of Japanese Patent Application No. 2009-192209 filed on Aug. 21, 2009, the contents of which are incorporated herein by reference.

FIELD OF THE INVENTION

The present invention relates to an organopolysilmethylene-siloxane composition which yields a cured product excellent in heat resistance, mechanical strength, electrical insulation property, electrical properties and water-proof property, and a cured product thereof.

BACKGROUND OF THE INVENTION

Curable silicone rubber compositions which cure to form a silicone rubber elastomer are well known and widely used as a gasket material for electric and electronic parts, a potting material, a coating material, a shaping material such as a molding material, a wire-covering material and automobile parts, on account of good properties of the compositions such as weathering resistance, heat resistance, and electrical insulation property. Curable silicone rubber compositions have siloxane bonds which are inherent in a silicone. A siloxane bond is ionic and, therefore, the curable silicone rubber compositions cannot exert the excellent properties of silicones such as chemical resistance, for instance, acid and alkali resistance, water-proof property and permeability for gas in extremely severe environments such as a hot and humid environment.

As a countermeasure for the afore-mentioned problem, a polymer is known where a part of its siloxane bonds is a silethylene bond (Patent Literature 1) or a silphenylene bond (Patent Literature 2). However, the synthesis of these polymers and, accordingly, their mass production, are difficult and, therefore the polymers are expensive. Therefore, the polymers have been commercialized only in special applications or in special fields.

As a precursor for silicon carbide ceramics, a polydiarylsilmethylenes having silmethylene bonds are known from Patent Literatures 3 to 5. These polymers are crystalline, thermoplastic silicon polymers having a high melting point and are good in heat resistance, insulation property, electrical properties, chemical resistance and water-proof property. However, the polymer is poor in processability by molding and, therefore, is not practically used. Various efforts have been made to improve the processability by molding. For instance, Patent Literature 6 describes a mixture of a polydiarylsilmethylene with a silicone polymer. Patent Literatures 7 and 8 describe mixtures of a polydiarylsilmethylene with a polyalkylsilmethylene. Patent Literature 9 describes a method for preparing a film of a polydiarylsilmethylene on a substrate where a film of disilacyclobutane is formed on a substrate and is ring-opening polymerized using fine particles of metal. However, the thermoplastic diarylsilmethylene polymer is highly crystalline and, therefore, is difficult to be synthesized. Accordingly, the diarylsilmethylene polymer is expensive and bad in processability. Therefore, research has been made to adopt the diarylsilmethylene polymer as a precursor for silicon carbide ceramics. However, a thermosetting composition is not known which takes advantages of the properties as a polymer.

PRIOR LITERATURES

Patent Literatures

Patent Literature 1: JP National Phase Publication No. 01/030887
Patent Literature 2: Japanese Patent Application Laid-Open No. Hei-5-320350
Patent Literature 3: Japanese Patent Application Laid-Open No. Hei-8-109264
Patent Literature 4: Japanese Patent Application Laid-Open No. Hei-8-109265
Patent Literature 5: Japanese Patent Application Laid-Open No. Hei-8-109266
Patent Literature 6: Japanese Patent Application Laid-Open No. Hei-9-227781
Patent Literature 7: Japanese Patent Application Laid-Open No. Hei-9-227782
Patent Literature 8: Japanese Patent Application Laid-Open No. Hei-9-227783
Patent Literature 9: Japanese Patent No. 3069655

SUMMARY OF THE INVENTION

Problems to be Solved by the Invention

The purpose of the present invention is to provide an condensation-curable organopolysilmethylene-siloxane, i.e., silicon polymer having a silmethylene bond; an organopolysilmethylene-siloxane composition which comprises a condensation-curable organopolysilmethylene-siloxane and, after cured, gives a product which has good heat resistance, electrical insulation property, water-proof property and processability by molding and low permeability for gas; and a cured product thereof.

Means to Solve the Problems

The present inventors eagerly made research to attain the afore-mentioned purpose and have succeeded in synthesizing an organopolysilmethylene-siloxane having, in a molecule, at least two out of alkoxy groups, hydroxy groups and halogen atoms bonded to one or more silicon atoms and have found that the afore-mentioned organopolysilmethylene-siloxane is condensation-reacted, optionally using a particular curing agent and a curing catalyst, to give a useful cured product.

Namely, the present invention provides an organopolysilmethylene-siloxane represented by the following general formula (1):

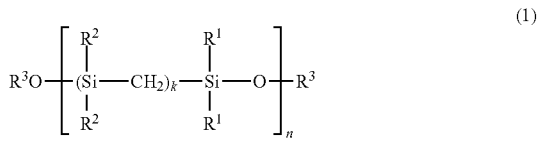

wherein $R^1$ is, independently of each other, a group selected from the group consisting of an unsubstituted or substituted monovalent hydrocarbon group having 1 to 10 carbon atoms other than an alkenyl group, an alkoxy group, a hydroxy group and a halogen atom; $R^2$ is, independently of each other, a group selected from the group consisting of an unsubstituted or substituted monovalent hydrocarbon group having 1 to 10 carbon atoms other than an alkenyl group, an alkoxy group, a hydroxy group, a halogen atom and $(R^1)_3SiCH_2$—, wherein $R^3$ is, independently of each other, a group selected from the group consisting of a hydrogen atom and an alkyl group having 1 to 4 carbon atoms; k is an integer of 1 to 100; and n is an integer of 1 to 1000; and having, in a molecule, at least two out of alkoxy groups, hydroxy groups and halogen atoms bonded to one or more silicon atoms.

Further, the present invention provides a method for preparing the aforesaid organopolysilmethylene-siloxane, comprising a step of hydrolyzing an organopolysilmethylene-siloxane represented by the following general formula (3):

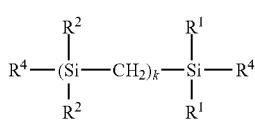
(3)

wherein $R^4$ is, independently of each other, a group selected from the group consisting of a chlorine atom, a hydroxy group and an alkoxy group having 1 to 4 carbon atoms; $R^1$, $R^2$ and k are as defined above and wherein k may be the same as or different from each other.

Furthermore, the present invention provides an organopolysilmethylene-siloxane composition comprising
(A) 1 to 100 parts by weight of the aforesaid organopolysilmethylene-siloxane (1),
(B) 0 to 99 parts by weight of an organopolysiloxane represented by the following general formula:

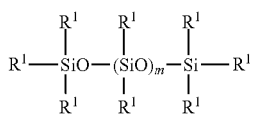
(4)

wherein $R^1$ is, independently of each other, a group selected from the group consisting of an unsubstituted or substituted monovalent hydrocarbon group having 1 to 10 carbon atoms other than an alkenyl group, an alkoxy group, a hydroxy group and a halogen atom, and m is an integer of 0 to 300; and having, in a molecule, at least two out of alkoxy groups, hydroxy groups and halogen atoms bonded to one or more silicon atoms, provided that a total of the amounts of (A) and (B) is 100 parts by weight;
(C) 0 to 30 parts by weight of a curing agent which is an organosilicon compound represented by the following general formula:

$$R_aSiX_{4-a}$$ (5)

and/or a partial hydrolysis condensate thereof,
wherein R is, independently of each other, a group selected from the group consisting of an unsubstituted or substituted monovalent hydrocarbon group having 1 to 10 carbon atoms; X is, independently of each other, a group selected from the group consisting of ketoxime, alkoxy, and 1-methylvinyloxy groups; and a is 0, 1, or 2; and
(D) a catalytic amount of a curing catalyst.
A cured product from the afore-mentioned composition is also provided.

Effects of the Invention

The organopolysilmethylene-siloxane composition of the present invention provides a cured product having excellent properties such as heat resistance, electrical insulation property, mechanical properties and optical properties. The cured product also shows low permeability for gas and excellent water-proof property and hydrolysis resistance even in extremely severe environments, whereas silicone rubbers do not show these properties. The organopolysilmethylene-siloxane composition of the present invention shows as good processability by molding as that of conventional silicone rubbers and, therefore, can be processed by conventional processing machinery such as a molding instrument. Molded products obtained from the organopolysilmethylene-siloxane composition of the present invention can be used in insulating materials, sealing materials, electric or electronic parts such as cables, packings, and connectors, automobile parts and semi-conductor devices, similarly to silicone rubbers. They can also be used for lenses or transparent sealing materials, taking advantages of its optical properties.

BRIEF DESCRIPTION IN A DRAWING

FIG. 1 shows NMR spectra of the compound prepared in Example 1.

BEST MODE OF THE INVENTION

The present invention will be further described below.
(A) Organopolysilmethylene-siloxane
Component (A) is an organopolysilmethylene-siloxane which is represented by the following general formula (1):

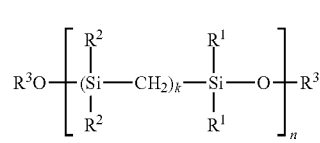
(1)

wherein $R^3$ is, independently of each other, a group selected from the group consisting of a hydrogen atom and an alkyl group having 1 to 4 carbon atoms; k is an integer of 1 to 100, preferably 1 to 50; n is an integer of 1 to 1000, preferably 1 to 100, more preferably 1 to 50; and having, in a molecule, at least two out of alkoxy groups, hydroxy groups and halogen atoms bonded to one or more silicon atoms; and which preferably has a viscosity at 25 degrees C. of 1 to 1,000,000 mm²/s.

In formula (1), $R^1$ is, independently of each other, a group selected from the group consisting of an unsubstituted or substituted monovalent hydrocarbon group having 1 to 10, preferably 1 to 6, carbon atoms other than an alkenyl group; alkoxy and hydroxy groups and a halogen atom. Examples of the monovalent hydrocarbon group include an alkyl group such as a methyl, ethyl, propyl, isopropyl, and butyl groups; a cycloalkyl group such as a cyclohexyl group; an aryl group such as phenyl and tolyl groups; an aralkyl group such as benzyl and 2-phenylethyl groups; and the groups where a part or whole of their hydrogen atoms bonded to each one carbon atom are replaced with a halogen atom or a cyano group, such as a chlormethyl, 3-chloropropyl, 3,3,3-trifluoropropyl, and 2-cyanoethyl groups. Inter alia, methyl and phenyl groups are preferred. Particularly, a methyl group is preferred for curing property of the composition and flexibility of the cured product. Particularly, 50 mol % or more of $R^1$ is preferably a methyl group.

$R^2$ is, independently of each other, a group selected from the group consisting of an unsubstituted or substituted monovalent hydrocarbon group having 1 to 10, preferably 1 to 6, carbon atoms other than an alkenyl group; an alkoxy group and a hydroxy group, a halogen atom and $(R^1)_3SiCH_2$—. Examples of the monovalent hydrocarbon group include an alkyl group such as a methyl, ethyl, propyl, isopropyl, and butyl groups; a cycloalkyl group such as a cyclohexyl group; an aryl group such as a phenyl and tolyl groups; an aralkyl group such as a benzyl group and 2-phenylethyl group; and the groups where a part or whole of their hydrogen atoms bonded to each one carbon atom are replaced with a halogen atom or a cyano group, such as a chlormethyl, 3-chloropropyl, 3,3,3-trifluoropropyl, and 2-cyanoethyl groups. Inter alia, methyl and phenyl groups are preferred. Particularly, a methyl group is preferred for curing property of the composition and flexibility of the cured product. Particularly, 50 mol % or more of $R^2$ is preferably a methyl group.

Inter alia, the organopolysilmethylene-siloxane is preferably represented by the following formula (2):

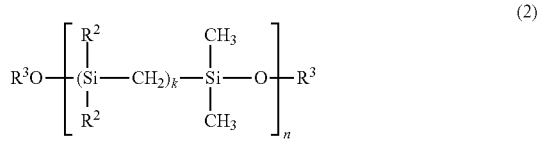

wherein $R^2$ is, independently of each other, a group selected from the group consisting of a methyl group and Y $(CH_3)_2SiCH_2$—; $R^3$ is a group selected from the group consisting of a hydrogen atom and an alkyl group having 1 to 4 carbon atoms; Y is a group selected from the group consisting of an alkoxy group having 1 to 4 carbon atoms and a hydroxy group; and k and n are as defined above.

The organopolysilmethylene-siloxane represented by the afore-mentioned formula (1) can be prepared by hydrolysis of an organopolysilmethyelene represented by the following formula (3) wherein the number of silmethylene units may be the same or different among the molecules. If required, a strong alkali such as KOH and NaOH is added after the hydrolysis to cause alkali polymerization and then the reaction mixture is washed with water and neutralized to obtain the organopolysilmethylene-siloxane of the present invention.

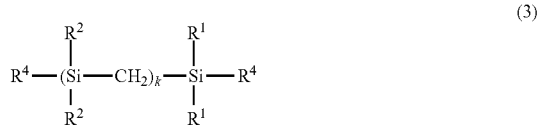

wherein $R^4$ is a chlorine atom, a hydroxy group or an alkoxy group having 1 to 4 carbon atoms and $R^1$, $R^2$ and k are as defined above.

Examples of the organopolysilmethylene-siloxane represented by the afore-mentioned formula (1) include the following:

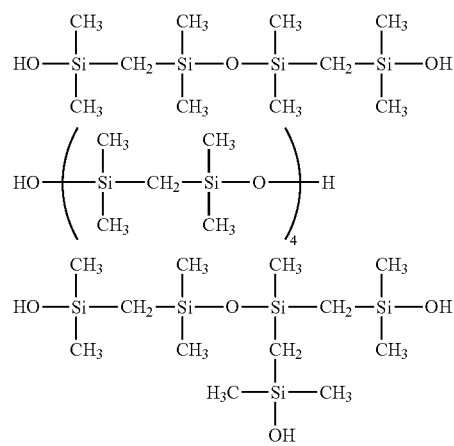

The present invention also provides an organopolysilmethylene-siloxane composition comprising (A) the organopolysilmethylene-siloxane represented by the afore-mentioned general formula (1); optionally, (C) a particular curing agent; and (D) a curing catalyst. The organopolysilmethylene-siloxane composition of the present invention may further comprise (B) an organopolysiloxane represented by the following general formula (4).

(B) Organopolysiloxane

Component (B) is an optional component which replaces a part of organopolysilmethylene-siloxane (A). Component (B) is represented by the following general formula (4):

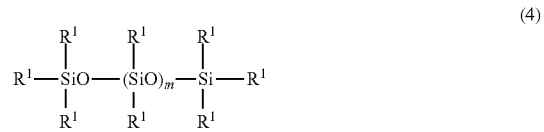

wherein m is an integer of 0 to 300, preferably 0 to 100, more preferably 0 to 20 and has at least two out of alkoxy groups, hydroxy groups and halogen atoms bonded to one or more silicon atoms. Its viscosity at 25 degrees C. is preferably 1 to 1,000,000 mm²/s.

In the afore-mentioned formula, $R^1$ is, independently of each other, a group selected from the group consisting of an unsubstituted or substituted monovalent hydrocarbon group having 1 to 10, preferably 1 to 6, carbon atoms other than an alkenyl group, an alkoxy group, a hydroxy group and a halogen atom. Examples of the monovalent hydrocarbon group include an alkyl group such as methyl, ethyl, propyl, isopropyl, and butyl groups; a cycloalkyl group such as a cyclohexyl group; an aryl group such as phenyl and tolyl groups; an aralkyl group such as benzyl and 2-phenylethyl groups; and the groups where a part or whole of their hydrogen atoms bonded to each one carbon atom are replaced with a halogen atom or a cyano group. Preferably, at least two out of $R^1$ are selected from the group consisting of alkoxy and hydroxy groups and a halogen atom and the rest of $R^1$ is a methyl group.

Inter alia, preferred is the organopolysiloxane having hydroxy groups on both ends and represented by the following formula (6):

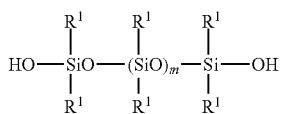

(6)

wherein $R^1$ is, independently of each other, a monovalent hydrocarbon group having 1 to 10 carbon atoms other than an alkenyl group, m is an integer of 0 to 300, preferably 0 to 100, more preferably 0 to 20.

In particular, preference is given to polydimethylsiloxane having hydroxy groups on both ends and copolymers having hydroxy groups on both ends and composed of polydimethylsiloxane and polymethylphenylsiloxane as each represented by the following formulas.

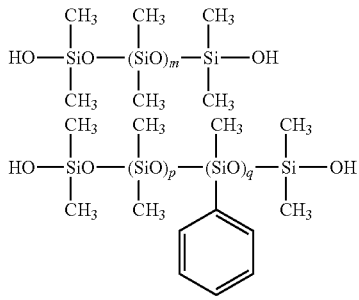

wherein m is as defined above and a total of p and q is an integer of 1 to 300, preferably 1 to 100, more preferably 1 to 20.

The present organopolysilmethylene-siloxane composition comprises 1 to 100 parts by weight of component (A) and 0 to 99 parts by weight of component (B), preferably 30 to 100 parts by weight of component (A) and 0 to 70 parts by weight of component (B), relative to 100 parts by weight of a total of components (A) and (B). If the amount of component (A) is less than the afore-mentioned lower limit, the organopolysilmethylene-siloxane does not exert its properties such as water resistance and optical properties.

(C) Curing Agent

Curing agent (C) condensates with organopolysilmethylene-siloxane (A) and organopolysiloxane (B) to form a cross-linking bond and yield a rubber elastomer with a three dimensional network.

The curing agent of the present invention is an organosilicon compound represented by the following general formula (5) and/or partial hydrolysis condensate thereof, $$R_aSiX_{4-a} \quad (5)$$

wherein R is, independently of each other, a group selected from the group consisting of unsubstituted or substituted monovalent hydrocarbon groups having 1 to 10 carbon atoms; X is, independently of each other, a group selected from the group consisting of ketoxime, alkoxy, and 1-methylvinyloxy groups and a is 0, 1, or 2; and having at least two groups selected from the group consisting of ketoxime, alkoxy, and 1-methylvinyloxy groups. A partial hydrolysis condensate is an organopolysiloxane obtained by condensation among partially hydrolyzed organosilicon compounds.

In formula (5), R is, independently of each other, an unsubstituted or substituted monovalent hydrocarbon group having 1 to 10 carbon atoms. Examples of the monovalent hydrocarbon group include an alkyl group such as methyl, ethyl, propyl, isopropyl, and butyl groups; a cycloalkyl group such as a cyclohexyl group; an alkenyl group such as vinyl and allyl groups; an aryl group such as phenyl and tolyl groups; an aralkyl group such as benzyl and 2-phenylethyl groups; and the groups where a part or whole of the hydrogen atoms bonded to carbon atoms of the aforesaid groups are replaced with a halogen atom or a cyano group, such as chloromethyl, 3-chloropropyl, 3,3,3-trifluoropropyl, and 2-cyanoethyl groups. Particularly, methyl, ethyl, vinyl and phenyl groups are preferred.

Examples of the organosilicon compound represented by formula (5) include ketoxime group-containing silanes such as methyltris(diethylketoxime)silane, methyltris(methylethylketoxime)silane, binyltris(methylethylketoxime)silane, and phenyltris(diethylketoxime)silane; alkoxy group-containing silanes such as trimethoxymethylsilane, trimethoxyphenylsilane, trimethoxyvinylsilane, triethoxymethylsilane, triethoxyphenylsilane, triethoxyvinylsilane, tetramethoxysilane and tetraethoxysilane; and 1-methylvinyloxy group-containing silanes such as tri(1-methylvinyloxy)methylsilane and tri(1-methylvinyloxy)phenylsilane. The curing agent of the present invention may be a partial hydrolysis condensate of the afore-mentioned organosilicon compounds. These curing agents may be used alone or in combination of two or more of them.

Component (C) is usually added in an amount of 0 to 30 parts by weight, preferably 1 to 20 parts by weight, more preferably 1 to 10 parts by weight, relative to 100 parts by weight of a total of the amounts of components (A) and (B). Below the afore-mentioned lower limit, storage stability and processability of the composition is so worse as to sometime cause gelation. If the amount exceeds the afore-mentioned upper limit, shrinkage after cured is so large that properties of the cured product obtained may be worse.

(D) Curing Catalyst

Curing catalyst (D) is to promote condensation between components (A) and (B) with component (C). Examples of the curing catalyst include metal salts of carboxylic acids such as stannous octoate, cobalt octoate, manganese octoate, zinc octoate, stannous octaoate, stannous caprylate and stannous oleate; organotin compounds such as dibutyltindiacetate, dibutyltindioctoate, dibutyltindilaurate, dibutyltindioleate, diphenyltindiacetate, dibutyltin oxide, dibutyltin dimethoxide, dibutylbis(triethoxy)tin, and dioctyltindilaurate; titanate esters such as tetrabutyl titanate, tetra-1-ethylhexyl titanate and tetraisopropenyl titanate; oraganotitanium compounds such as tetra(organosiliconate)titanium; titanium chelates such as triethanolamine titanate and titanium acetylacetonate; and alkoxy aluminum compounds. The curing catalyst may be a 2-guanidyl group-containing silane as follows.

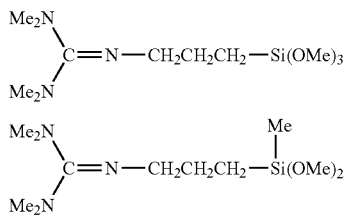

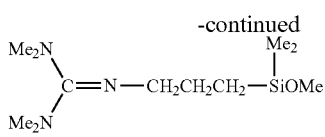

In the formulas, Me represents a methyl group.

The curing catalyst may be blended in such an amount that the catalyst works effectively. The amount may be properly increased or decreased depending upon a desired curing rate. The amount may not be particularly restricted, but is 0.01 to 10 parts by weight, preferably 0.1 to 5 parts by weight, relative to 100 parts by weight of total of components (A), (B) and (C).

Other Components

The organopolysilmethylene-siloxane composition of the present invention may comprise, in addition to the aforementioned components (A) to (D), a variety of functional additives, for instance, reinforcing fillers, heat stabilizers, antioxidants, ultraviolet rays absorbers, photo stabilizers, agents rendering conductivity, agents rendering adhesiveness, coloring agents, lubricants, plasticizers, anti-static agents, and flame retardants as long as the purposes and effects of the present invention are not impaired. For instance, examples of the additives include reinforcing fillers such as fumed silica and precipitated silica; fillers such as diatom earth, graphite, aluminum oxide, mica, clay, carbon, titanium oxide and glass beads; conductive materials; pigments; lubricants; and polydimethylsiloxane as a mold release agent.

The organopolysilmethylene-siloxane composition of the present invention can be obtained by blending the aforementioned components in a planetary mixer or Shinagawa mixer according to conventional methods. A curing method and curing conditions of the organopolysilmethylene-siloxane composition of the present invention may be conventional ones and may be selected, depending on types of compositions. The composition of the present invention cures with moisture in the atmosphere and, therefore shall be stored in an atmosphere where moisture is kept out. Curing is preferably performed at a temperature of 60 to 150 degrees C. and a humidity of 20 to 80% for 0.5 to 24 hours.

The cured product of the organopolysilmethylene-siloxane composition of the present invention is excellent in mechanical strength, heat resistance, electrical insulation property, water-proof property, and optical properties; low in permeability for gas; and is most suitable as optical materials which particularly need transparency, such as LED lenses and sealing materials for LED.

EXAMPLES

The present invention will be described below more in detail by referring to the Examples and Comparative Examples, but shall not be limited thereto. In the following description, "part" or "parts" means part or parts by mass. A viscosity is a value measured at 25 degrees C. with a rotational viscometer, BM type ex Toki Sangyo Co., Ltd.

Example 1

Preparation of Organopolysilmethylene-siloxane (A1)

1000 Grams (3.01 mols) of the chlorine atom containing silmethylene of the following formula (7) were dissolved in 800 grams of xylene and added dropwise at 60 degrees C. to a solvent mixture composed of 500 grams of water and 250 grams of xylene to hydrolyze. Then, the reaction mixture was aged at room temperature for 3 hours, the formed acid was separated and removed. The organic phase was washed with water, filtered and stripped at 160 degrees C./5 mmHg for 30 minutes.

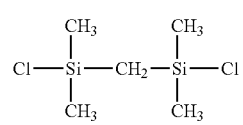

The product obtained was analyzed by $^1$H-NMR and was found to be organopolysilmethylene-siloxane (A1) represented by the following formula (8). The viscosity was 5 mm$^2$/s. The NMR spectra of A1 are shown in FIG. 1 (NMR: JNM-LA300WB ex JOEL, 300 MHz, $^1$H-NMR, DMSO-d as a deuterated solvent)

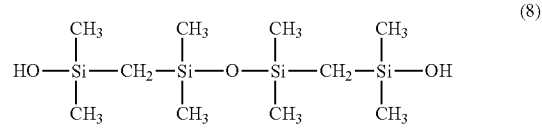 [SMILES: C[Si](C)(O)C[Si](C)(C)O[Si](C)(C)C[Si](C)(C)O]

Example 2

Preparation of Organopolysilmethylene-siloxane (A2)

1000 Grams (3.01 mols) of chlorine atom-containing silmethylene of the afore-mentioned formula (7) were dissolved in 800 grams of xylene and added dropwise to a solvent mixture composed of 500 grams of water and 250 grams of xylene at a temperature of 60 degrees C. to hydrolyze. Then, the reaction mixture was aged at room temperature for 3 hours, and the formed acid was separated. The remaining mixture was washed with water and subjected to azeotropic dehydration at 140 degrees C. To this polysilmethylene having terminal hydroxyl groups on both ends added was 0.2 gram of KOH, followed by alkali polymerization at 140 degrees C. for 10 hours. Then, the reaction mixture was neutralized, filtered and, subsequently, stripped at 160 degrees C./5 mm Hg for 30 minutes to obtain the organopolysilmethylene-siloxane (A2) represented by the following formula (9). The viscosity was 20 mm$^2$/s.

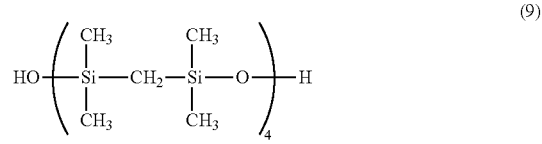

Example 3

100 Parts of organopolysilmethylene-siloxane (A1) prepared in Example 1, 2.0 parts of tetraethoxysiloxane (C1) and 0.2 part of dibutyltindilaurate (D) were blended homogeneously to obtain an organopolysilmethylene-siloxane composition. The resulting composition was poured into a mold of 130 mm long×170 mm wide×2 mm deep and the mold was placed in a desiccator. Then, the composition was defoamed under a reduced pressure of 10 Torr for 10 minutes and left at 25 degrees C. and a relative humidity of 60% for one week to allow to cure. A cured product of the polysilmethylene of 1.0 mm thick was obtained. The properties of the cured product are shown in Table 1.

Example 4

100 Parts of organopolysilmethylene-siloxane (A2) prepared in Example 2, 2.0 parts of methyltris(diethylketoxime) silane (C2) represented by the following formula (10) and 0.2 part of dibutyltindilaurate (D) were blended homogeneously to obtain an organopolysilmethylene-siloxane composition. A cured product of the organopolysilmethylene-siloxane was prepared, as in Example 3. The properties of the cured product are shown in Table 1.

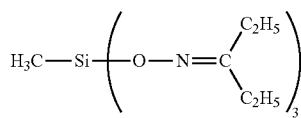
(10)

Example 5

70 Parts of organopolysilmethylene-siloxane (A1) prepared in Example 1, 30 parts of dimethylpolysiloxane (B1) represented by the following formula (11) and having a viscosity of 10 mm²/s and 0.2 part of dibutyltindilaurate (D) were blended homogeneously to obtain an organopolysilmethylene-siloxane composition. A cured product of the organopolysilmethylene-siloxane composition was prepared, as in Example 3. The properties of the cured product are shown in Table 1.

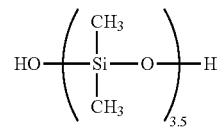
(11)

Example 6

50 Parts of organopolysilmethylene-siloxane (A2) prepared in Example 2, 50 parts of dimethylpolysiloxane (B1) represented by the afore-mentioned formula (11) and having a viscosity of 25 mm²/s and 0.2 part of dibutyltindilaurate (D) were blended homogeneously to obtain an organopolysilmethylene-siloxane composition. A cured product of the polysilmethylene-polysiloxane composition was prepared, as in Example 3. The properties of the cured product are shown in Table 1.

Comparative Example

100 Parts of dimethylpolysiloxane (B1) represented by the afore-mentioned formula (11) and having a viscosity of 25 mm²/s, 2.0 parts of tetraethoxysilane (C1) and 0.2 part of dibutyltindilaurate (D) were blended homogeneously to obtain an organopolysiloxane composition. A cured product of the organopolysiloxane was prepared, as in Example 3.

The properties of the cured products were evaluated in the following methods. Results are shown in Table 1.

(1) Appearance of a cured product is observed by the naked eye to evaluate discoloration and transparency.

(2) Hardness is determined with a durometer of type A in accordance with Japanese Industrial Standards (JIS) K6253.

(3) A tensile strength, an elongation, a density, a volume resistivity, an electrical breakdown strength, a specific inductive and a dielectric tangent are determined according to JIS K6249.

(4) Water vapor permeability is determined according to JIS Z0208.

Table 1

TABLE 1

| Properties after cured | Example 3 | Example 4 | Example 5 | Example 6 | Comparative Example |
|---|---|---|---|---|---|
| Appearance | Colorless and transparent | Colorless and transparent | Colorless and transparent | Colorless and transparent | Colorless and transparent |
| Hardness (Type A) | 75 | 40 | 30 | 25 | 35 |
| Tensile Strength in MPa | 3 | 5 | 2 | 4 | 0.3 |
| Elongation in % | 30 | 120 | 160 | 180 | 150 |
| Density | 1.07 | 1.07 | 1.07 | 1.07 | 1.07 |
| Water Vapor Permeability in g/m² · 24 hr | 15 | 19 | 22 | 25 | 55 |
| Volume Resistivity in TΩ · cm | 50 | 22 | 25 | 26 | 5 |
| Electrical Breakdown Strength in KV/mm | 37 | 30 | 23 | 22 | 20 |
| Specific Inductive (50 Hz) | 2.99 | 3.00 | 2.90 | 2.90 | 2.77 |
| Dielectric Tangent (50 Hz) | 0.001 | 0.001 | 0.001 | 0.001 | 0.001 |
| Hardness after heated at 150 degrees C. for 1000 hrs | 79 | 45 | 35 | 28 | 40 |

As seen in Table 1, the cured products of the organopolysilmethylene-siloxanes of Examples 3 to 6 are transparent, excellent in mechanical strength and less permeable by water vapor. The cured product of the Comparative Example is worse in mechanical strength and more permeable by water vapor.

INDUSTRIAL APPLICABILITY

The organopolysilmethylene-siloxane composition of the present invention provides a cured product excellent in mechanical properties, heat resistance, electrical insulation property, water resistance, and low permeability for gas; optical properties; and is very suitable as optical materials which particularly need transparency, such as LED lenses and sealing materials for LED.

The invention claimed is:

1. A method comprising applying to an LED an organopolysilmethylene-siloxane composition comprising:

(A) 1 to 100 parts by weight of an organopolysilmethylene-siloxane represented by the following general formula (1):

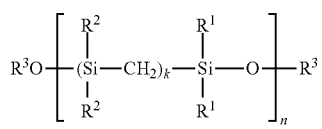

wherein: $R^1$ is, independently of each other, a group selected from the group consisting of an unsubstituted or substituted monovalent hydrocarbon group having 1 to 10 carbon atoms other than an alkenyl group, an alkoxy group, a hydroxy group, and a halogen atom; $R^2$ is, independently of each other, a group selected from the group consisting of an unsubstituted or substituted monovalent hydrocarbon group having 1 to 10 carbon atoms other than an alkenyl group, an alkoxy group, a hydroxy group, a halogen atom, and $(R^1)_3SiCH_2-$; $R^3$ is, independently of each other, a group selected from the group consisting of a hydrogen atom and an alkyl group having 1 to 4 carbon atoms; k is an integer of 1 to 100; and n is an integer of 1 to 1000, said organopolysilmethylene-siloxane having, in a molecule, at least two out of alkoxy groups, hydroxy groups, and halogen atoms bonded to one or more silicon atoms;

(B) 0 to 99 parts by weight, provided that a total of the amounts of (A) and (B) is 100 parts by weight, of an organopolysiloxane represented by the following general formula:

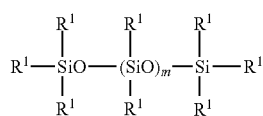

wherein $R^1$ is, independently of each other, a group selected from the group consisting of an unsubstituted or substituted monovalent hydrocarbon group having 1 to 10 carbon atoms other than an alkenyl group, an alkoxy group, a hydroxy group, and a halogen atom, and m is an integer of 0 to 300; and having, in a molecule, at least two out of alkoxy groups, hydroxy groups and halogen atoms bonded to one or more silicon atoms;

(C) 1 to 30 parts by weight of a curing agent which is an organosilicon compound represented by the following general formula:

$$R_a SiX_{4-a} \quad (5)$$

and/or a partial hydrolysis condensate thereof, wherein R is, independently of each other, a group selected from the group consisting of an unsubstituted or substituted monovalent hydrocarbon group having 1 to 10 carbon atoms; X is, independently of each other, a group selected from the group consisting of ketoxime, alkoxy, and 1-methylvinyloxy groups; and a is 0, 1, or 2; and (D) a catalytic amount of a curing catalyst and curing the composition, thereby providing a sealing material on the LED.

2. The method of claim 1, wherein said organopolysilmethylene-siloxane composition comprises
   30 to 100 parts by weight of organopolysilmethylene-siloxane component (A); and
   0 to 70 parts by weight of organopolysiloxane component (B).

3. The method of claim 1, wherein organopolysiloxane (B) is represented by the following formula (6):

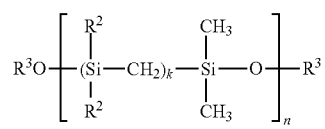

wherein $R^1$ is, independently of each other, a monovalent hydrocarbon group having 1 to 10 carbon atoms other than an alkenyl group and m is an integer of 0 to 300.

4. The method of claim 1, wherein organopolysilmethylene-siloxane component (A) is represented by the following formula (2):

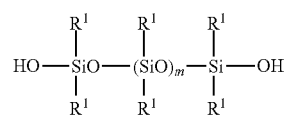

wherein $R^2$ is, independently of each other, a group selected from the group consisting of a methyl group and $Y(CH_3)_2SiCH_2-$, $R^3$ is a group selected from the group consisting of a hydrogen atom and an alkyl group having 1 to 4 carbon atoms, Y is a group selected from the group consisting of an alkoxy group having 1 to 4 carbon atoms and a hydroxy group, k is an integer of 1 to 100, and n is an integer of 1 to 1000.

5. An LED lens comprising a cured organopolysilmethylene-siloxane product from an organopolysilmethylene-siloxane composition comprising:

(A) 1 to 100 parts by weight of an organopolysilmethylene-siloxane represented by the following general formula (1):

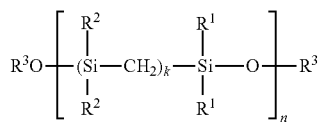 (1)

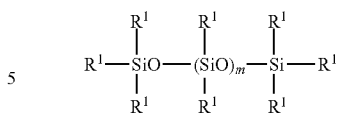 (4)

wherein: $R^1$ is, independently of each other, a group selected from the group consisting of an unsubstituted or substituted monovalent hydrocarbon group having 1 to 10 carbon atoms other than an alkenyl group, an alkoxy group, a hydroxy group, and a halogen atom; $R^2$ is, independently of each other, a group selected from the group consisting of an unsubstituted or substituted monovalent hydrocarbon group having 1 to 10 carbon atoms other than an alkenyl group, an alkoxy group, a hydroxy group, a halogen atom, and $(R^1)_3SiCH_2$—; $R^3$ is, independently of each other, a group selected from the group consisting of a hydrogen atom and an alkyl group having 1 to 4 carbon atoms; k is an integer of 1 to 100; and n is an integer of 1 to 1000, said organopolysilmethylene-siloxane having, in a molecule, at least two out of alkoxy groups, hydroxy groups, and halogen atoms bonded to one or more silicon atoms;

(B) 0 to 99 parts by weight, provided that a total of the amounts of (A) and (B) is 100 parts by weight of an organopolysiloxane represented by the following general formula:

wherein $R^1$ is, independently of each other, a group selected from the group consisting of an unsubstituted or substituted monovalent hydrocarbon group having 1 to 10 carbon atoms other than an alkenyl group, an alkoxy group, a hydroxy group, and a halogen atom, and m is an integer of 0 to 300; and having, in a molecule, at least two out of alkoxy groups, hydroxy groups and halogen atoms bonded to one or more silicon atoms;

(C) 1 to 30 parts by weight of a curing agent which is an organosilicon compound represented by the following general formula:

$$R_aSiX_{4-a} \quad (5)$$

and/or a partial hydrolysis condensate thereof, wherein R is, independently of each other, a group selected from the group consisting of an unsubstituted or substituted monovalent hydrocarbon group having 1 to 10 carbon atoms; X is, independently of each other, a group selected from the group consisting of ketoxime, alkoxy, and 1-methylvinyloxy groups; and a is 0, 1, or 2; and (D) a catalytic amount of a curing catalyst.

* * * * *